United States Patent
Rivest et al.

(10) Patent No.: US 7,693,784 B2
(45) Date of Patent: *Apr. 6, 2010

(54) METHOD AND SYSTEM FOR REPORTING CASHFLOWS TO CLIENTS

(75) Inventors: Serge Rivest, Mississauga (CA); Michael King, Aurora (CA); Richard Clark, Markham (CA)

(73) Assignee: Davis + Henderson, Limited Partnership, Toronto, Ontario (CA)

( * ) Notice: Subject to any disclaimer, the term of this patent is extended or adjusted under 35 U.S.C. 154(b) by 656 days.

This patent is subject to a terminal disclaimer.

(21) Appl. No.: 11/514,206

(22) Filed: Sep. 1, 2006

(65) Prior Publication Data
US 2007/0055626 A1    Mar. 8, 2007

(30) Foreign Application Priority Data
Sep. 1, 2005    (CA) .................................... 2518010

(51) Int. Cl.
*G06Q 40/00* (2006.01)
(52) U.S. Cl. .................. 705/38; 705/35; 705/36 R; 705/39; 705/40; 283/57; 283/58; 283/59
(58) Field of Classification Search .................. 705/38, 705/25–45; 283/57–59
See application file for complete search history.

(56) References Cited

U.S. PATENT DOCUMENTS

| | | | | |
|---|---|---|---|---|
| 5,146,403 A | * | 9/1992 | Goodman | .................... 707/102 |
| 5,825,003 A | * | 10/1998 | Jennings et al. | ............. 235/379 |
| 6,128,603 A | * | 10/2000 | Dent et al. | .................... 705/40 |
| 7,206,768 B1 | * | 4/2007 | deGroeve et al. | ............. 705/54 |
| 2002/0029194 A1 | * | 3/2002 | Lewis et al. | .................... 705/39 |
| 2002/0082987 A1 | * | 6/2002 | Wilson | ........................ 705/39 |
| 2002/0116335 A1 | * | 8/2002 | Star | ............................ 705/42 |
| 2003/0225642 A1 | * | 12/2003 | Baker et al. | .................... 705/35 |
| 2004/0034595 A1 | * | 2/2004 | Kugeman et al. | ............. 705/40 |
| 2004/0230523 A1 | * | 11/2004 | Johnson | ....................... 705/40 |
| 2007/0061260 A1 | * | 3/2007 | deGroeve et al. | ............. 705/44 |
| 2007/0106558 A1 | * | 5/2007 | Mitchell et al. | ............... 705/16 |

* cited by examiner

*Primary Examiner*—Kirsten S Apple
(74) *Attorney, Agent, or Firm*—Lang Michener LLP

(57) ABSTRACT

A system and method of providing a client with cashflow monitoring during a transfer of services (e.g. pre-authorized debits and credits) from a first account to a second account, the method comprising the steps of: (i) determining an effective date for the transfer of each service, said effective dates creating a transfer window; (ii) determining cashflows for said first account and said second account during said transfer window; (iii) adjusting effective dates for transfer of each services to avoid cashflow interruptions in said first and said second accounts; and (iv) providing a cashflow analysis to the client that lists all the effective dates for each service transfer and predicted cashflows for said first and said second account during said transfer window.

16 Claims, 1 Drawing Sheet

METHOD AND SYSTEM FOR REPORTING CASHFLOWS TO CLIENTS

FIELD OF THE INVENTION

The present invention relates to a system and method for assisting a client in the transfer of usage of accounts (e.g. pre-authorized debits and credits) at one or more financial institutions. More specifically, the present invention relates to a system and method which tracks cashflow and prepares a report to the client to assist in ensuring sufficient funds are present in all accounts during the transfer process.

BACKGROUND OF THE INVENTION

The financial industry has undergone significant changes in the last ten years. In addition to traditional banks, trust companies and other conventional financial institutions, many new financial institutions and categories of financial institutions have been created. These many financial institutions have accordingly become increasingly competitive in acquiring clients and make significant efforts to acquire new clients from other, competitor, institutions. Significant marketing efforts, discounts, service bundles and other incentives are employed by financial institutions to attract new clients, often from their competitors.

At the same time as the financial institutions have become more competitive in acquiring clients, the array of services that financial institutions offer their clients has increased and can include automated payments of utility company and other bills of the client, investment and money management services, automated transfers between accounts and/or institutions, etc. Also, financial institutions have introduced new services for their existing clients in efforts to retain those clients, increase profitability and/or expand the range of services offered by the financial institution. Further, many non-financial service providers have established interfaces to financial institutions which allow them to directly debit or credit their client's accounts with the financial institution.

As a consequence of the wide array of services available to the clients of financial institutions, clients may have a great deal of difficulty and/or inconvenience in transferring their existing services, including pre-authorized payments, credits and even their payroll, from an existing account to a new account, at the same financial institution or at a new institution. Thus, despite the above-mentioned significant efforts expended by a financial institution to attract new clients and/or retain existing clients, the inconvenience caused to, and effort required by, clients to transfer and/or reestablish existing services for a new account can be such a significant disincentive that the clients will not establish the new account and/or move to a new financial institution.

Another concern for clients is the need to monitor the timing of the transfer events and the status of the accounts to ensure the sufficient funds are available in each account to cover all of the transactions which take place during the transfer process.

It is desired to have a system and method for assisting a client who is transferring and/or reestablishing financial services with the monitoring of deadlines and cashflows.

SUMMARY OF THE INVENTION

It is an object of the present invention to provide a novel system and method for assisting clients who are transferring financial services, such as pre-authorized debits and credits, using a first account to instead use a second account in monitoring dates and cashflow during the transfer process, which obviates or mitigates at least one disadvantage of the prior art.

According to a first aspect of the present invention, there is provided a system and method of providing a client with cashflow monitoring during a transfer of services from a first account to a second account, the method comprising the steps of: (i) determining an effective date for the transfer of each service, said effective dates creating a transfer window; (ii) determining cashflows for said first account and said second account during said transfer window; (iii) adjusting effective dates for transfer of each services to avoid cashflow interruptions in said first and said second accounts; and (iv) providing a cashflow analysis to the client that lists all the effective dates for each service transfer and predicted cashflows for said first and said second account during said transfer window.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
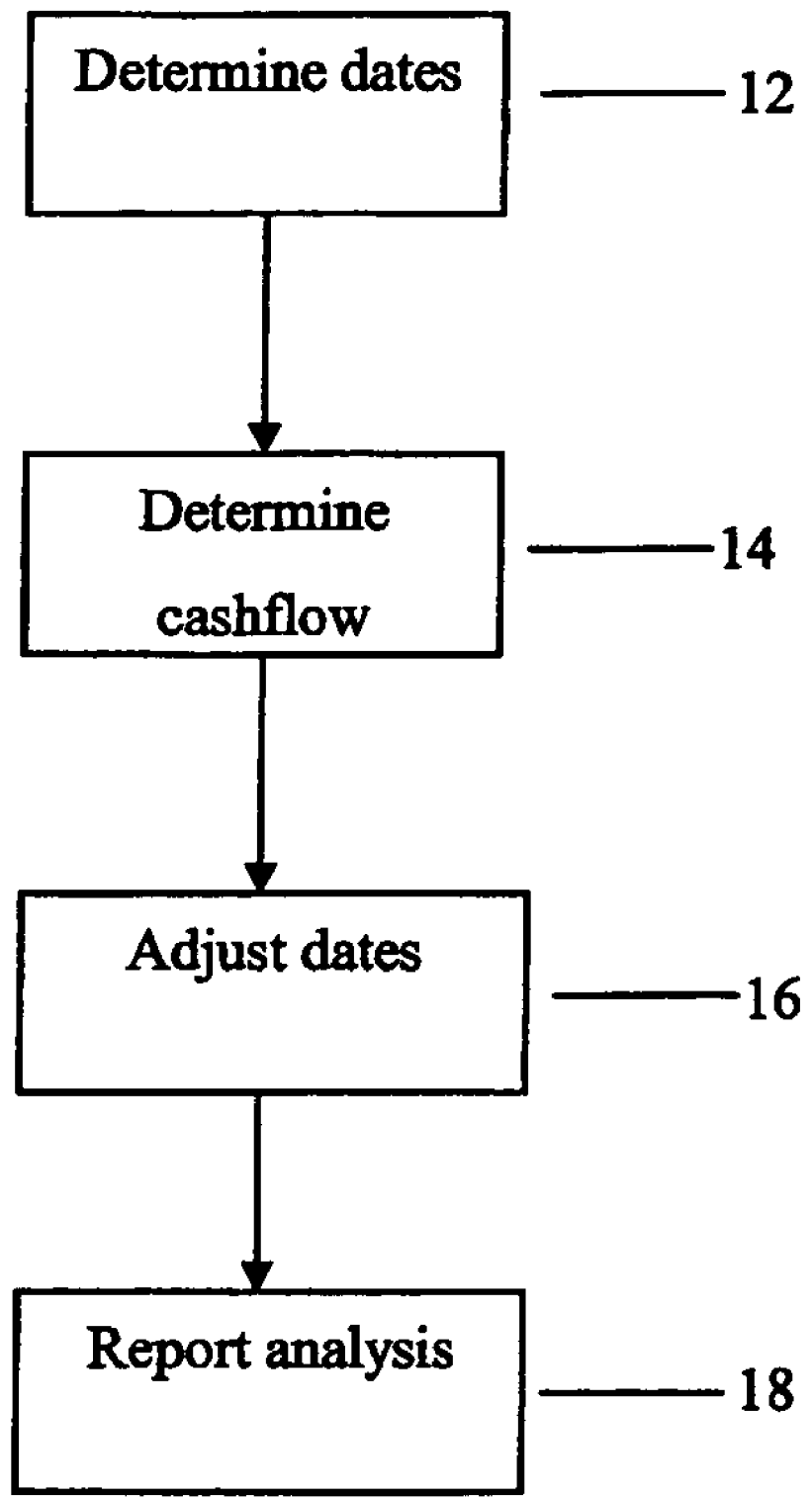
FIG. 1 shows a flowchart illustrating the steps of a method in accordance with the present invention.

The inventive cashflow monitoring system and method described herein is contemplated for use as part of a larger system for assisting a financial institution client to transfer financial services such as pre-authorized debits and credits using a first account to use a second account. It is contemplated that the cashflow system will typically be operated by a third party service organization and financial institutions will retain the services of the third party service organization as necessary, but it is also contemplated that a financial institution itself can operate the cashflow system.

In the following discussion, it is assumed that the first account is at a first (old) financial institution and that the second account is at a second (new) financial institution, but the present invention is not so limited and both the first and second account can be at a single financial institution, albeit being at different branches of the financial institution and/or being different types of account (i.e., chequing account, investment or money market account, etc.) or even two of the same type of account at a single branch. Further, as used herein, the term "account" is intended to comprise any financial account that can be maintained for a client and includes, without limitation, chequing accounts, savings accounts, money market or investment accounts, credit card accounts, line of credit accounts, etc.

FIG. 1 shows the steps of the method after the transfer request has been processed and the necessary information for the transfer has been gathered. Specifically, at step 12 a cashflow engine examines the services of the client which are to be transferred and determines the dates on which the services will effectively be transferred, including any lead time needed to effect a transfer. The lead time is determined from the billing cycle of the financial service provider, as well as the time required for that provider to record and effect a change. The lead time may be provided by the service providers or may be calculated by the cashflow engine based on historical lead times for the particular service, service provider and/or financial institution or combination thereof. This step creates a transfer window covering the date when the transfer process is effectively begun (first service transferred to second account) and the date when it effectively ends (all services transferred to the second account). If only a single service is being transferred, the transfer window can effectively be as short as a single day.

The next step 14 is to determine the cashflows in the first account and the cashflows in the second account which will result as services are transferred. As part of this cashflow analysis, cashflow engine considers the equivalent dates for each service to be transferred as determined in the previous step. From this analysis, the cashflow engine determines at step 16 the desired dates for each transfer to be effected which will avoid, where possible, undesirable cashflow spikes or interruptions in both the first account and the second account.

The construction of cashflow engine is not particularly limited and can comprise one or more personal computers connected within a larger system via a local area network and executing an operating system such as Microsoft Windows XP.

In addition to determining the desired dates for the transfers, at step 18 the cashflow engine also prepares a cashflow report for the client, showing the expected resulting cashflows in the first account and the second account and, preferably, this cashflow report also provides a clear indication to the client as to when the transfer of each service is expected to occur.

The cashflow report is sent to the client, via the appropriate interaction method, such as a paper-based (fax transmission) report, an email report or a web-based report. The client can use this cashflow report to manage the balances in their previous and new accounts during the transition state as the services are being transferred between the first account and the second account.

For example, if a payroll deposit is one of the services which is being transferred between the previous account and the new account, the cashflow report can suggest the best time to effect the payroll deposit transfer and can indicate any specific transfers of funds which the client will need to make to cover the cashflows during the transition period.

While the discussion above refers to circumstances wherein the client is transferring services between accounts at one or more financial institutions, it is contemplated that the present invention can also be employed to re-establish services where the account information of a client needs to be changed to reflect changes in the transit number or other information of the financial institution at which the accounts are located or specific information about the account needs to be changed. For example, information identifying the account and/or financial institution may change as a result of a merger between to financial institutions, an amalgamation of two branches of a financial institution, etc., or for preauthorized credit card transactions, the expiry date of the credit card will need to be updated from time to time. The present invention can effectively deal with any of these circumstances and a variety of others as may occur to those of skill in the art.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of providing a client with cashflow monitoring during a transfer of services such as pre-authorized debits and credits, from a first account to a second account, the method comprising the steps of:
    (i) determining an effective date for the transfer of each service, said effective dates creating a transfer window;
    (ii) determining cashflows for said first account and said second account during said transfer window;
    (iii) electronically adjusting effective dates for transfer of each service to avoid cashflow interruptions in said first and said second accounts; and
    (iv) providing a cashflow analysis to the client that lists all the effective dates for each service transfer and predicted cashflows for said first and said second account during said transfer window.

2. The method of claim 1 wherein said cashflow analysis further provides a report to the client listing transactions that are to be executed by the client during said transfer window.

3. The method of claim 2, wherein said cashflow analysis further includes a recommend date to switch payroll deposits from said first account to said second account.

4. The method of claim 2 further comprising the step of having the cashflow analysis determine a final date by which all services will be transferred from the first account and listing said final date for a transfer of the balance of the first account to the second account.

5. The method of claim 1 wherein the first account is provided by a first financial institution and the second account is provided by a second financial institution.

6. The method of claim 1 wherein the first account is provided by a first branch of a financial institution and the second account is provided by a second branch of the financial institution.

7. The method of claim 1 wherein the first and second accounts are provided by the same financial institution, the first account being a different type of account than the second account.

8. The method of claim 1 wherein the first and second accounts are provided by the same financial institution.

9. A method of providing a client with cashflow monitoring during a transfer of services such as pre-authorized debits and credits, from a first account to a second account, using a computer system, the method comprising the steps of:
    (i) determining an effective date for the transfer of each service, said effective dates creating a transfer window;
    (ii) determining cashflows for said first account and said second account during said transfer window;
    (iii) electronically adjusting effective dates for transfer of each service to avoid cashflow interruptions in said first and said second accounts; and
    (iv) preparing a cashflow analysis for the client that lists all the effective dates for each service transfer and predicted cashflows for said first and said second account during said transfer window.

10. The method of claim 9 wherein said cashflow analysis further provides a report to the client listing transactions that are to be executed by the client during said transfer window.

11. The method of claim 10, wherein said cashflow analysis further includes a recommend date to switch payroll deposits from said first account to said second account.

12. The method of claim 10 further comprising the step of having the cashflow analysis determine a final date by which all services will be transferred from the first account and listing said final date for a transfer of the balance of the first account to the second account.

13. The method of claim 9 wherein the first account is provided by a first financial institution and the second account is provided by a second financial institution.

14. The method of claim 9 wherein the first account is provided by a first branch of a financial institution and the second account is provided by a second branch of the financial institution.

15. The method of claim 9 wherein the first and second accounts are provided by the same financial institution, the first account being a different type of account than the second account.

16. The method of claim 9 wherein the first and second accounts are provided by the same financial institution.

* * * * *